US007309376B2

(12) United States Patent
Barre et al.

(10) Patent No.: US 7,309,376 B2
(45) Date of Patent: Dec. 18, 2007

(54) METHOD AND INSTALLATION FOR PRODUCING BREATHABLE AIR

(75) Inventors: Didier Barre, Caisson (FR); Roland Baudet, Beaumount les Valence (FR)

(73) Assignees: Compagnie Generale des Matieres Nucleaires, Velizy Villacoublay (FR); Commissariat a l'Energie Atomique, Paris (FR)

( * ) Notice: Subject to any disclaimer, the term of this patent is extended or adjusted under 35 U.S.C. 154(b) by 480 days.

(21) Appl. No.: 10/503,398

(22) PCT Filed: Feb. 5, 2003

(86) PCT No.: PCT/FR03/00353

§ 371 (c)(1),
(2), (4) Date: Aug. 3, 2004

(87) PCT Pub. No.: WO03/066167

PCT Pub. Date: Aug. 14, 2003

(65) Prior Publication Data

US 2006/0060082 A1 Mar. 23, 2006

(30) Foreign Application Priority Data

Feb. 7, 2002 (FR) .................................. 02 01485

(51) Int. Cl.
*B01D 53/02* (2006.01)
*A62B 7/10* (2006.01)

(52) U.S. Cl. ....................... 95/10; 96/134; 55/DIG. 17; 423/247; 236/44 R

(58) Field of Classification Search .................. 96/108, 96/134, 135, 417; 95/10, 90, 117; 55/DIG. 17; 423/247; 422/120; 236/44 R; 128/204.14
See application file for complete search history.

(56) References Cited

U.S. PATENT DOCUMENTS

| | | | | | |
|---|---|---|---|---|---|
| RE18,831 | E | * | 5/1933 | Fleisher | 95/10 |
| 3,221,477 | A | | 12/1965 | Arnoldi et al. | |
| 4,054,428 | A | | 10/1977 | Foltz | |
| 4,340,112 | A | * | 7/1982 | Sutoh et al. | 165/229 |
| 4,449,990 | A | | 5/1984 | Tedford, Jr. | |
| 4,862,950 | A | * | 9/1989 | Gribble et al. | 165/229 |
| 5,118,327 | A | * | 6/1992 | Nelson et al. | 95/10 |
| 5,531,801 | A | * | 7/1996 | Sewell et al. | 96/240 |
| 5,725,639 | A | * | 3/1998 | Khelifa et al. | 96/112 |
| 2001/0027678 | A1 | * | 10/2001 | Mottram et al. | 73/23.2 |

FOREIGN PATENT DOCUMENTS

| | | | | |
|---|---|---|---|---|
| EP | 1 027 913 | A1 | | 8/2000 |
| FR | 2558737 | A1 | * | 8/1985 |
| JP | 09-276408 | A | * | 10/1997 |

* cited by examiner

*Primary Examiner*—Frank M. Lawrence
(74) *Attorney, Agent, or Firm*—Pearne & Gordon LLP

(57) ABSTRACT

The invention relates to a process for producing respirable air comprising the following stages: treatment of compressed air comprising an air-drying operation; and rehumidification of the treated dry air. According to the invention, the rehumidification stage of the treated dry air comprises an operation of controlled distribution of the treated dry air on the one hand in a rehumidification line (24), and on the other hand in a dry line (22). The invention also relates to an installation (1) for utilising such a process. Application to the area of nuclear installation dismantling.

15 Claims, 1 Drawing Sheet

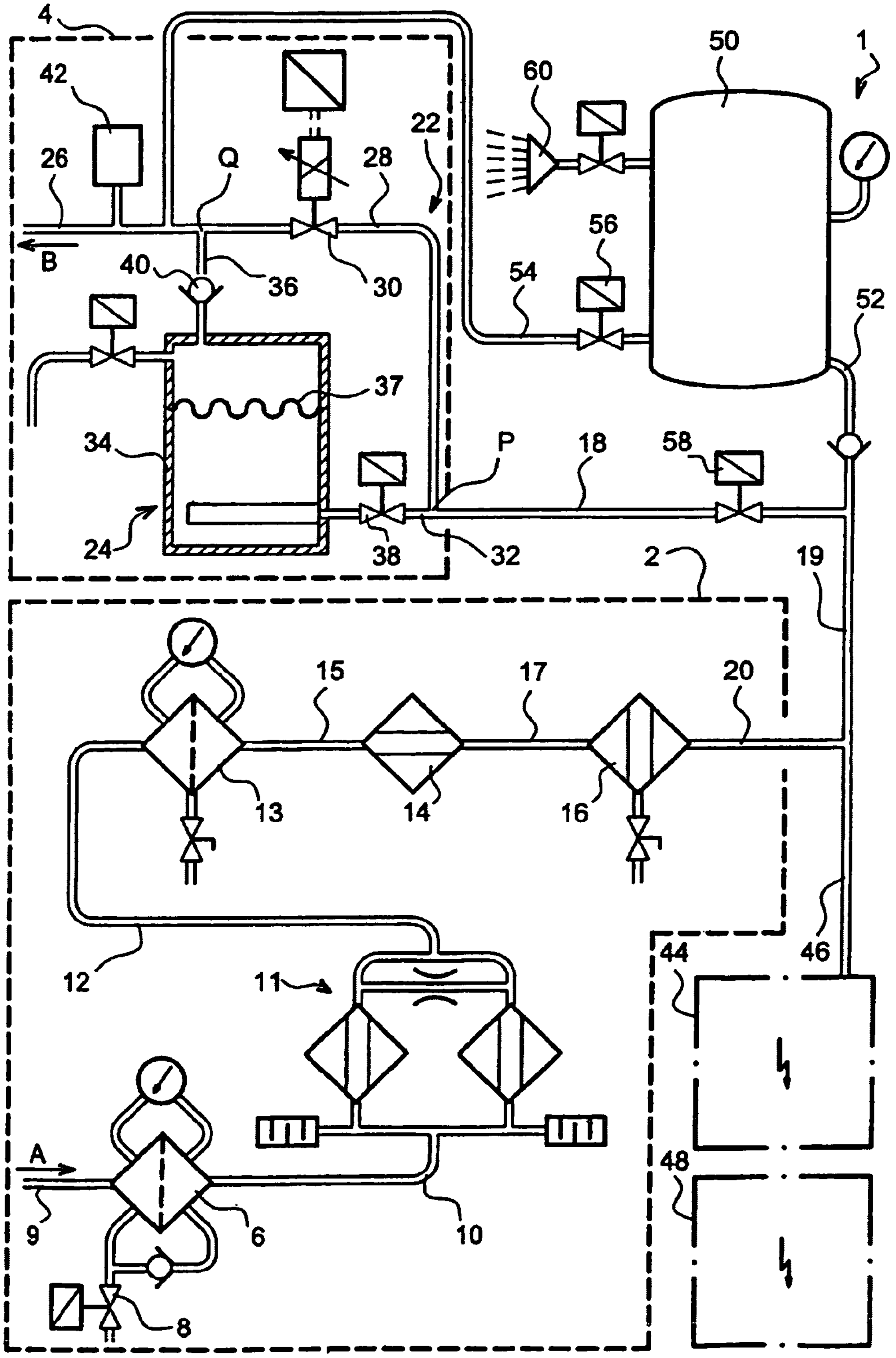
4
42
26
B
Q
40
36
28
30
22
37
34
24
38
P
32
18
58
60
50
1
56
54
52
2
19
15
17
20
13
14
16
12
11
46
44
48
A
9
6
8
10

METHOD AND INSTALLATION FOR PRODUCING BREATHABLE AIR

TECHNICAL FIELD

The present invention relates to the field of processes for the production of respirable air comprising a treatment stage for compressed air, the latter in addition comprising an operation for drying the air.

More particularly, the invention concerns processes for production of respirable air to be used by operators carrying out works on sensitive sites, such as for example works for dismantling nuclear plants, or again works for removing asbestos. Also by way of example, the air produced by such processes can also be for medical use.

The invention also relates to production installations for respirable air likely to utilise such processes.

PRIOR ART

In conventional processes of production of respirable air, a stage for treating compressed air supplied by one or more compressors is first carried out, such that the maximum of impurities is extracted from the air consumed by users.

To do this, carbon monoxide is essentially trapped by means of a catalyst, this gas being obtainable in highly significant quantities in compressed air coming from compressors. The harmful presence of this gas and other such as carbon dioxide can especially result from various malfunctions of air compressors being used, or again from the proximity between the aspiration of the compressors and these different gases contained in the atmosphere.

It is noted that in the case of dismantling work on nuclear installations, the air breathed by the operators must respect certain characteristics, itemised in the standard NE EN 12021. In this respect, this standard indicates that the maximum admissible value of carbon dioxide in respirable air is 500 ppm, and that the maximum admissible value of carbon monoxide in respirable air is 15 ppm.

During the treatment stage of compressed air, a drying operation of the air is undertaken by adsorption, with a dew point of between −40° C. and −70° C.

During this aspiration, the quasi-totality of the carbon dioxide is trapped, whereas all trace of humidity in the air is reduced. This allows the catalyst used for trapping the carbon monoxide to function correctly.

In this type of process, the respirable air produced responds to the specifications of the abovementioned standard, but all the same poses a major drawback.

In effect, because of the drying operation performed during the treatment stage of the previously described process, the air produced is very dry. Consequently, it is likely to cause desiccation of the respiratory organs in the operators consuming this air.

To reply to this problem, it has been proposed to add a rehumidification stage of the treated air, so that the supplied air has a humidity rate relatively similar to that of the air aspirated by the compressors.

This type of process is especially mentioned in the document U.S. Pat. No. 4,054,428.

This process is utilised by an installation comprising two chambers containing agents enabling compressed air to be dehumidified. As the compressed air passes into the first of these chambers, the air is dried, and then it passes through a space in which the carbon monoxide is transformed into carbon dioxide. The dehumidified air then circulates in the second chamber of the installation, where it is rehumidified by means of agents contained in this second chamber, having absorbed humidity during a previous cycle.

To utilise this process, the installation also comprises a four-way valve, allowing the direction of flow of compressed air to be inverted across the installation, so that this compressed air circulates alternatively from the first to the second chamber, and from the second to the first chamber. Note that this recurring inversion of direction of the flow of compressed air across the installation is a necessary condition for obtaining rehumidification of the air produced. Accordingly, this installation seems only slightly adapted to the continuous production of air, and in no case allows the production of respirable air at a constant rate of humidity, over a significant period.

In addition, this type of process comprises a certain number of major disadvantages, especially including that of the complexity of the installation utilised, or again that of the incapacity of regulating the rate of humidity of the respirable air produced. Another disadvantage is the risk of desorption of carbon dioxide, recovered as the air passes through the column for rehumidifying.

EXPLANATION OF THE INVENTION

The first object of the invention is to propose a process for producing respirable air, at least partially eliminating the disadvantages of the processes of the prior art mentioned hereinabove.

In addition, another object of the invention is an installation for production of respirable air, for executing a process such as that responding to the object mentioned hereinabove.

To achieve this, the primary object of the invention is a for production of respirable air comprising the following stages:

treatment of compressed air comprising an air drying operation;

rehumidification of the treated dry air.

According to the present invention the re-humidification stage of the treated dry air comprises an operation for controlled redistribution of the treated dry air on one hand in a rehumidification method, and on the other hand in a dry method.

Advantageously, the process according to the present invention produces respirable air at a regulatable and constant rate of humidity, irrespective of the rate of air to be produced.

Preferably, the distribution of treated dry air is controlled by means of a regulating valve mounted on the rehumidification line and controlled by pilot means sensitive to the signal output by a probe measuring the rate of humidity, the probe being mounted on an outlet pipe connected at one end to the rehumidification line, and at the other end to the dry line.

In addition, a difference can be made in pressure between the rehumidification line and the dry line, so as to favour the passage of treated dry air originating from the dry line, in the outlet pipe. Thus, the probe measuring the rate of humidity will not be wet excessively, the consequence of which would be to render it inoperable.

Preferably, the stage for treatment of compressed air comprises the following operations:

filtering condensates found in the compressed air;

drying the air to eliminate any trace of humidity in the air;

filtering dust dislodged during the drying operation;

transformation of carbon monoxide contained in the compressed air into carbon dioxide;

filtering the air using an active carbon filter.

In a preferred manner, the stage for treatment of the compressed air is followed by a permanent stage of analysis of quantities of carbon monoxide and carbon dioxide present in the treated air, then an alert stage when the values of these quantities exceed maximum values to be observed.

Finally, after the rehumidification stage of the treated dry air, the air has a rate of humidity of between approximately 40 and 50%, and can be provided to feed at least a ventilated suit of an operator carrying out dismantling works for nuclear plants.

Yet another object of the invention is an installation for production of respirable air comprising:

means for processing compressed air comprising means for drying air;

means for rehumidification of dry treated air.

According to the present invention the means for rehumidification of the treated dry air comprise a rehumidification line and a dry line, as well as distribution means for controlled distribution of the treated dry air in each of the lines.

Other characteristics and advantages of the invention will emerge from the following detailed, non-limiting description.

BRIEF DESCRIPTION OF THE DRAWINGS

The description will be given with reference to the sole attached FIGURE, illustrating a schematic view of an installation for production of respirable air according to a preferred embodiment of the invention.

DETAILED EXPLANATION OF A PREFERRED EMBODIMENT

In reference to the sole FIGURE, the present invention concerns an installation 1 for production of respirable air by humans, for use on an industrial site where operations generating ambient air pollution air are carried out, by fumes, dust, vapours, in particular on premises, in a room or a closed structure.

Preferably, the installation 1 for production of respirable air is applied in the area of dismantling nuclear plants, and the operators carrying out the works are constrained from carrying ventilated suits, so as to avoid being in contact with contaminated zones.

It should be noted that the description to be given for an installation 1 for production of respirable air to be connected to ventilated suits (not shown) of operators carrying out dismantling work on nuclear plants, but that of course the installation 1 and the process forming objects of the invention apply equally to areas other than nuclear.

By way of examples, the invention could also find application on work sites for removing asbestos which generate particles and asbestos dust likely to be carcinogenic, on work sites where painting operations are carried out, or again at sites where welding or metal cutting are carried out, with substantial emission of smoke.

The installation 1 is fed with compressed air by air compression means (not shown) allowing the air to be compressed at a pressure greater than 1 bar, and preferably between 9 and 15 bars. In addition, the air compression means are adapted to supply a rate of compressed air of between 10 $m^3$/h and 1000 $m^3$/h per installation.

For example, the air compression means can take the form of compressors lubricated by screws or pistons, or again take the form of dry-screw compressors.

The compressed air leaving the compression means is usually loaded with a multitude of impurities, such that it is necessary to extract before directing this air to the different ventilated suits of the operators working on the site.

The harmful substances giving the greatest concern are carbon monoxide (CO) and carbon dioxide ($CO_2$), which when present in excessive quantities within a ventilated suit, can engender catastrophic consequences for an operator wearing this suit.

The origins of the presence of such substances in the compressed air exiting from the compression means are diverse and varied. By way of example, this can be a question of the defective character of a separator filter of a lubricated compressor, the rupture of the cooling circuit of a dry-screw compressor, or the simple presence of these gases in the atmosphere in proximity to the aspiration of the compression means.

Furthermore, a European standard NE EN 12021 indicates the maximum values on CO and $CO_2$, which can make up the air to be breathed.

As for $CO_2$, the maximum admissible value imposed by this standard is 500 ppm (particles per million), this low value being adapted so that the air produced approaches the maximum of natural air, generally containing in the region of 400 ppm of $CO_2$.

In the same way, for CO, the maximum value imposed by this standard is 15 ppm, this gas known to be extremely toxic.

To eliminate as much as possible the harmful substances contained in the compressed air supplied to the installation 1, the latter first comprises processing means 2 for compressed air, especially allowing drying of the air to be redistributed.

In addition, because of the possibility of desiccation of the respiratory passages of humans breathing the treated dry air exiting from the processing means 2, the installation 4 has rehumidification means 4 of the treated dry air, connected to the processing means 2.

The different elements making up the processing means 2 will now be described, in the order corresponding to that in which the compressed air encounters these elements, as it passes through the installation 1.

The processing means 2 first comprise a separator filter 6 at 0.01 ppm, whereof the essential role is to trap the condensates in the compressed air. The filter 6 is equipped with an automatic purge electrovalve 8, for evacuating the different filtered substances. The filter 6 is attached at one end to a pipe 9 communicating with the air compression means (not shown), and at the other end to a pipe 10 communicating also with drying means of the dryer adsorption type II.

The aim of the adsorption dryer 11, with a dew point of −73° C. under pressure, is to eliminate any trace of humidity in the compressed air. Note that the dryer 11 comprises a molecular screen (not shown) trapping the quasi-totality of the $CO_2$ contained in the compressed air.

Connected directly to the adsorption dryer 11 by means of a pipe 12, the processing means 2 have a filter 13 of 1 micron particles, whereof the principal function is to stop the dust dislodges by the dryer 11.

In addition, the presence of a catalyst 14 of CO-$CO_2$ connected to the filter 13 by means of a pipe 15 can be noticed, this catalyst being capable of retaining the CO by means of the hopcalite (mixture of metallic oxides), and catalysing the transformation of the carbon monoxide into carbon dioxide. It should be specified that the adsorption dryer 11 is placed upstream of the catalyst 14, the humidity contained in the air being highly prejudicial to the correct functioning of the CO-$CO_2$ catalyst.

Finally, the processing means 2 are constituted by an active carbon filter 16, for removing any trace of taste and odour from the treated air, and attached to the catalyst 14 by means of a pipe 17. The active carbon filter 16 is also attached to an exit pipe 20 of the processing means 2.

The rehumidification means 4 of the treated air will now be described, still with reference to the sole FIGURE.

The rehumidification means 4 comprise an inlet pipe 18, attached to the outlet pipe 20 of the treatment means 2 by a pipe 19.

At a point P situated on the inlet pipe 18, the latter is divided into two to form two parallel lines 22 and 24, which join at a point Q where they attach to an outlet pipe 26 of the rehumidification means 4.

Of the two lines 22 and 24, a dry line 22 is first evident, made up of a principal dry air pipe 28 on which is mounted close to the point Q an anti-return valve 30 with a known loss of load. This loss of load will preferably be of the order of 300 mbar.

The other line situated between the points P and Q is a rehumidification line 24. This line 24 comprises successively between points P and Q a pipe for derivation of dry air 32, a water tank 34, as well as an air pipe saturated in humidity 36. Note that the pipe for derivation of dry air 32 communicates with a part of the tank 34 filled with water, while the air pipe saturated in humidity 36 communicates with a part of the tank 34 not including water. In other terms, a water level 37 inside the tank 34 is preferably maintained such that the water in the tank 34 is always in contact with the pipe for derivation of dry air 32, but never in contact with the air pipe saturated in humidity 36.

It is specified that a regulating valve 38 be mounted on the pipe for derivation of dry air 32, while an anti-return valve 40 is mounted on the pipe of air saturated in n humidity 36, near point Q.

As mentioned hereinabove, the dry line 22 and the rehumidification line 24 join up at point Q, to the main dry air pipes 28 and air saturated in humidity 36 The pipes 28 and 36 are attached to the outlet pipe 26, on which is mounted a probe 42 for measuring the rate of humidity of the treated air. The probe 42 is attached to pilot means 48, sensitive to the signal emitted by the probe 42, and capable of piloting the regulating valve 38 mounted on the pipe for derivation of dry air 32. The installation 1 for production of respirable air functions as follows.

The compressed air coming from the compression means enters the installation 1 via the pipe 9, as is indicated by the arrow A, then first undergoes treatment by successively borrowing the following elements: the pipe 9, the oil separator filter 6, the pipe 10, the dryer 11, the pipe 12, the particle filter 13, the pipe 15, the catalyst 14, the pipe 17, the active carbon filter 16, and the pipe 20.

In this pipe 20 the air circulating inside is dry and treated, and is conveyed to the rehumidification means 4 by way of the pipe 19, connected to the inlet pipe 38.

When treated dry air arrives at point P, it is distributed both into the main dry air pipe 28, and also into the pipe for derivation of dry air 32. The presence of distribution means, constituted in the embodiment described by the regulating valve 38, fully controls the ratio between the quantity of treated air passing through the main dry air pipe 28, and the quantity of treated air circulating in the pipe for derivation of dry air 32.

The air circulating in the main dry air pipe 28 does not undergo any specific treatment, and is conveyed only to the point 4 where it is mixed with the treated air originating from the rehumidification line 24. On the other hand, the air circulating in the pipe for derivation of dry air 32 transits via the water tank 34 where it is loaded with humidity to saturation point, then rejoins point Q by way of the pipe of air saturated in humidity 36. Note that the anti-return valve 40 is provided so that the dry air coming from the main dry air pipe 28 does not enter inside the water tank 34.

In this way, the outlet pipe 26 contains a mixture of dry air and air saturated in humidity, this mixture being adapted to obtain a predetermined rate of humidity of air produced by the installation 1. In fact, to obtain the desired proportions of dry air and air saturated in humidity leading to the predetermined rate of humidity, the probe 42 constantly controls, by means of pilot means 48, the opening of the regulating valve 38, and consequently authorises a limited and variable quantity of dry air coming from the inlet pipe 18 to pass through. Because of this, the more the desired rate of humidity is raised, the more the controlled opening of the regulating valve 38 is important. Note also that the probe 42 also controls the temperature of the supplied air.

Permanent regulation of the valve 38 is also of interest when the rate of air from the installation 1 varies, this especially being the case when the number of operators breathing the air produced by the installation 1 increases or decreases. In such a situation, a change in the rate of air inside the installation 1 can cause a change in the distribution of treated dry air between the pipes 28 and 32, the consequence of which could be to modify the rate of humidity in the air produced circulating in the outlet pipe 26. However, since the probe 42 constantly measures the rate of humidity at the outlet of the installation 1, it allows the opening of the regulating valve 38 to be readjusted in real time, such that the resulting air can keep the same rate of humidity as that of the air produced when the number of ventilated suits connected to the installation 1 is different.

With such an installation 1, there is provision to obtain treated air whereof the rate of humidity is constant, irrespective of the rate of the installation 1, this rate of humidity of the air being preferably between 40 and 50%.

The role of the anti-return valve 30 with known loss of load is essentially to create a difference in pressure between the main dry air pipe 28, and the pipe for air saturated in humidity 36. Such a difference in pressure tends to favour the passage of dry air originating from the main dry air pipe 28, in the outlet pipe 26. By using this particular arrangement, only the air coming from the pipe of air saturated in humidity 36 rejoining the outlet pipe 26 is avoided, the effect of which is to excessively wet the probe 42, and to then make it inoperative.

The treated and rehumidified air circulating inside the outlet pipe 26 can thus exit the installation 1 (arrow B) at a controlled rate of humidity, and be redistributed to the ventilated suits of the operators.

According to a preferred embodiment of the invention, the installation 1 comprises analysis means 44 for quantities of CO and $CO_2$ contained in the air leaving the processing means 2. The analysis means 44 communicate with the processing means 2 by way of a pipe 46, directly attached to the outlet pipe 20 of the processing means 2.

The analysis means 44 verify permanently that the quantities of CO and $CO_2$ in the treated air do not exceed maximum values, preferably constituted by the values indicated in the European standard mentioned previously.

In the event where at least one of the maximum values is exceeded and detected by the analysis means 44, the pilot means 48 are likely to control one or more actions informing of the detected malfunctioning.

By way of example, the pilot means 48 can then control triggering a sound and/or visual alarm which can be located at the intervention site of the operators, or control a stop in the production of air from the installation 1, or a change in the source of compressed air, by tilting for example on an emergency compressor.

In addition, note that the pilot means 48 preferably comprise an inverter (not shown) producing at least one of the commands mentioned hereinabove, during a drop in the supply voltage from the installation 1.

To secure the installation 1 even further, a reserve of treated air 50 can be provided, preferably having a capacity of approximately 1000 litres, fed by treated air by way of a pipe 52 communicating with the pipe 19 of the installation 1.

The reserve of air 50 communicates with the outlet pipe 26, preferably between the point Q and the probe 42, by means of a pipe 54 on which is mounted an electrovalve 56, kept closed during normal operation of the installation 1.

On the other hand, when the analysis means 44 detect a malfunction in the installation 1, they are also able to control the closing of an electrovalve 58 mounted on the inlet pipe 18, and thus cut the influx of air originating from the processing means 2. In addition, by controlling the opening of the electrovalve 56, the pilot means 48 authorise the passage of air stored in the reserve 50 through the pipe 54, in the direction of the pipe 25 between the point Q and the probe 42. Deflecting to the reserve of treated air 50 allows the active operators to have available a sufficient quantity of air in their ventilated suits, so they can leave the work site in total security.

An additional alarm of the pneumatic alarm type 60 supplied by the reserve of air 50 can also be provided on the reserve of air 50, this alarm 60 being particularly significant since it is capable of functioning even during a break in power supply and a breakdown by the inverter.

The invention also relates to a process for producing respirable air for use by an installation 1 such as that which has just been described hereinabove.

The process comprises the successive stages of processing compressed air and rehumidification of the treated dry air. In the rehumidification stage of the treated dry air, the distribution of treated dry air is controlled, between a dry line 22 and a rehumidification line 24, so as to obtain a mix of treated air at a predetermined rate of humidity.

It is understood that various modifications can be made by the expert to the installation 1 for production of air and to the process, which have just been described, solely by way of non-limiting examples.

The invention claimed is:

1. A process for production of respirable air comprising the following stages:

- treatment of compressed air comprising an operation for drying the air;
- rehumidification of the treated dry air, characterised in that the rehumidification stage of the treated dry air comprises an operation for controlled distribution of the treated dry air on the one hand in a rehumidification line (24), and on the other hand in a dry line (22), and
- characterised in that a difference in pressure is created between the rehumidification line (24) and the dry line (22), 50 as to favour the passing of treated dry air coming from the dry line (22), in an outlet pipe (26), wherein said difference in pressure is obtained through an anti-return valve (30) mounted on a dry air pipe (28) with known loss of load.

2. The process as claimed in claim 1, characterised in that the distribution of treated dry air is controlled by means of a regulating valve (38) mounted on the rehumidification line (24) and controlled by pilot means (48) sensitive to the signal emitted by a probe (42) measuring the rate of humidity, said probe (42) being mounted on the outlet pipe (26), wherein said probe (42) is attached at one end to the rehumidification line (24) and at the other end to the dry line (22).

3. The process as claimed in claim 1 or claim 2, characterised in that the treatment stage of compressed air comprises the following operations:

- filtering of condensates in the compressed air;
- drying the air so as to eliminate any trace of humidity in the air;
- filtering dust dislodged during the drying operation;
- transformation of carbon monoxide contained in the compressed air to carbon dioxide; and
- filtering the air by means of an active carbon filter (16).

4. The process as claimed in claim 1 or claim 2, characterised in that the treatment stage of the compressed air is followed by a permanent analysis stage of quantities of carbon monoxide and carbon dioxide present in the treated air, then by an alert stage when the values of these quantities exceed maximum values to be respected.

5. The process as claimed in claim 1 or claim 2, characterised in that after the rehumidification stage of the treated dry air the air has a rate of humidity of between approximately 40 and 50%.

6. The process as claimed in claim 1 or claim 2, characterised in that rehumidified treated air is provided to supply at least one ventilated suit of an operator carrying out dismantling work on nuclear installations.

7. An installation (1) for production of respirable air comprising:

- processing means (2) for compressed air comprising means for drying the air (11); and
- rehumidification means (4) of treated dry air;
- characterised in that the rehumidification means (4) of the treated dry air comprise:
  - a rehumidification line (24) and a dry line (22), as well as distribution means (38) for controlled distribution of the treated dry air in each of said lines (22, 24);
  - an inlet pipe (18) containing treated dry air attached at one end to a main pipe of dry air (28) constituting the dry line (22), and at the other end to a pipe for derivation of dry air (32) belonging to the rehumidification line (24);
  - an outlet pipe (26) attached at one end to a pipe of air saturated in humidity (36) belonging to the rehumidification line (24), and at the other end to said main dry air pipe (28); and
  - a water tank (34) belonging to the rehumidification line (24), communicating at one end with said pipe for derivation of dry air (32), and at the other end with said pipe of air saturated in humidity (36); and
  - an anti-return valve (30) with known loss of load, mounted on said main dry air pipe (28).

8. The installation (1) as claimed in claim 7, characterised in that the means for distributing the treated dry air are made up of a regulating valve (38) mounted on said pipe for derivation of dry air (32), said regulating valve being controlled by pilot means (48), sensitive to the signal emitted by a probe (42) measuring the rate of humidity, mounted on said outlet pipe (26).

9. The installation (1) as claimed in claim 7, characterised in that the anti-return valve (30) with known load loss causes a drop in pressure in the main dry air pipe (28) of around 300 mbar.

10. The installation (1) as claimed in any one of claims 7, 8 and 9, characterised in that the rehumidification means (4) of the treated dry air further comprise an anti-return valve (40) mounted on said pipe of air saturated in humidity (36).

11. The installation (1) as claimed in any one of claims 8, and 9, characterised in that the processing means (2) for compressed air comprise:

an oil separator filter (6) at 0.01 ppm;

an adsorption dryer (11) with a dew point of −73° C.;

a 1-micron particle filter (13);

a catalyst (14) for transforming carbon monoxide into carbon dioxide; and an active carbon filter (16).

12. The installation (1) as claimed in any one of claims 8, and 9, characterised in that it further comprises, at the outlet processing means (2) for compressed air, analysis means (44) for permanently controlling the quantities of carbon monoxide and carbon dioxide present in the treated air.

13. The installation (1) as claimed in claim 12, characterised in that the analysis means (44) communicate with the pilot means (48) for controlling triggering a sound and/or visual alarm, and/or deflection to a reserve of treated air (50), and/or a change in the source of compressed air.

14. The installation (1) as claimed in any one of claims 7, 8 and 9, characterised in that it is capable of supplying respirable air at a rate of humidity of between approximately 40 and 50%.

15. The installation as claimed in any one of claims 7, 8 and 9, characterised in that it is attached to at least one ventilated suit of an operator carrying out dismantling work on nuclear installations.

* * * * *